United States Patent
Lauffer et al.

(10) Patent No.: US 10,796,121 B1
(45) Date of Patent: *Oct. 6, 2020

(54) DECODING PARTS WITH ENCODED GEOMETRY FOR RETRIEVING PASSIVELY REPRESENTED INFORMATION

(71) Applicant: Dell Products L.P., Round Rock, TX (US)

(72) Inventors: Scott C. Lauffer, Austin, TX (US); Matthew B. Gilbert, Austin, TX (US); Richard W. Guzman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,119

(22) Filed: May 31, 2019

(51) Int. Cl.
  *G06K 7/14* (2006.01)
  *G06K 19/06* (2006.01)
(52) U.S. Cl.
  CPC ......... *G06K 7/1408* (2013.01); *G06K 7/1417* (2013.01); *G06K 19/06037* (2013.01)
(58) Field of Classification Search
  CPC ............... G06K 7/1417; G06K 7/1426; G06K 19/06037; G06K 19/06093; G06K 19/06121; G06K 19/06159; G06K 2019/06271
  See application file for complete search history.

(56) References Cited

U.S. PATENT DOCUMENTS

| | | | |
|---|---|---|---|
| 6,533,181 B1 | 3/2003 | Roxby et al. | |
| 7,661,596 B1 | 2/2010 | Spitz et al. | |
| 8,130,407 B2 | 3/2012 | Nose et al. | |
| 9,600,694 B1 | 3/2017 | Memering et al. | |
| 9,858,604 B2 | 1/2018 | Apsley et al. | |
| 10,303,907 B1* | 5/2019 | Lauffer | G06K 7/10544 |
| 10,528,855 B2 | 1/2020 | Guzman et al. | |
| 2004/0020989 A1 | 2/2004 | Muramatsu | |
| 2006/0273147 A1 | 12/2006 | Jackson et al. | |
| 2013/0153651 A1 | 6/2013 | Fedorovskaya et al. | |
| 2013/0306721 A1 | 11/2013 | Meng | |
| 2014/0115708 A1* | 4/2014 | Terwilliger | G06F 21/36 726/26 |
| 2016/0260001 A1 | 9/2016 | Flores et al. | |
| 2019/0212955 A1 | 7/2019 | Gutierrez et al. | |
| 2019/0228194 A1* | 7/2019 | Lauffer | G06K 7/10544 |
| 2019/0377920 A1* | 12/2019 | Lauffer | G06K 7/1443 |

OTHER PUBLICATIONS

List of Patents or Applications Treated as Related, 2020.

* cited by examiner

*Primary Examiner* — Suezu Ellis

(74) *Attorney, Agent, or Firm* — Terrile, Cannatti & Chambers; Stephen A. Terrile

(57) ABSTRACT

A system, method, and computer-readable medium for decoding an encoded geometry. Decoding the encoded geometry includes: scanning an encoded geometry, the scanning comprising scanning a plurality of multi-dimensional symbols of the encoded geometry; identifying each of the plurality of multi-dimensional symbols; decoding each identifier multi-dimensional symbol to provide encoded geometry information; accessing an encoded geometry repository; and, retrieving data associated with the encoded geometry information.

20 Claims, 17 Drawing Sheets

US 10,796,121 B1

DECODING PARTS WITH ENCODED GEOMETRY FOR RETRIEVING PASSIVELY REPRESENTED INFORMATION

BACKGROUND OF THE INVENTION

Field of the Invention

The present invention relates to information handling systems. More specifically, embodiments of the invention relate to decoding parts with an encoded geometry for retrieving passively represented information.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers. In such IT environments it is often desirable to be able to identify individual information handling systems and related IT systems. A known method of identifying these systems is associating a unique identifier such as a bar code or a quick response (QR) code with the system. This unique identifier is often visibly attached to the system so that the unique identifier may be accessed by an IT technician using a scanner. However, unique identifiers such as bar codes and QR codes are not aesthetically pleasing, don't blend in with the system, can be scratched off or damaged, and involve extra processes to label objects.

SUMMARY OF THE INVENTION

A system, method, and computer-readable medium are disclosed for performing a physical part detection operation. In certain embodiments, the physical part detection operation includes decoding an encoded geometry, comprising: scanning an encoded geometry, the scanning comprising scanning a plurality of multi-dimensional symbols of the encoded geometry; identifying each of the plurality of multi-dimensional symbols; decoding each identifier multi-dimensional symbol to provide encoded geometry information; accessing an encoded geometry repository; and, retrieving data associated with the encoded geometry information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
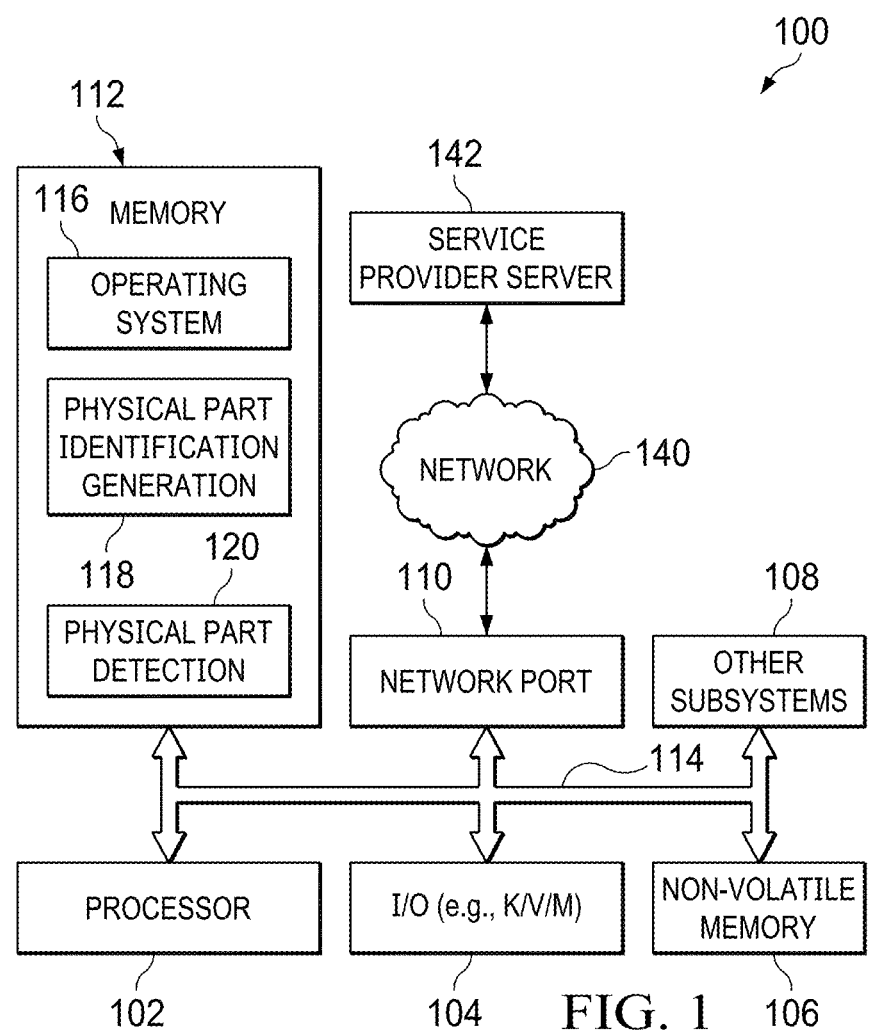
FIG. 1 shows a general illustration of components of an information handling system as implemented in the system and method of the present invention.

A system, method, and computer-readable medium are disclosed for performing a physical part detection operation. In certain embodiments, the physical part detection operation includes decoding an encoded geometry, comprising: scanning an encoded geometry, the scanning comprising scanning a plurality of multi-dimensional symbols of the encoded geometry; identifying each of the plurality of multi-dimensional symbols; decoding each identifier multi-dimensional symbol to provide encoded geometry information; accessing an encoded geometry repository associating an encoded geometry with a unique identifier of an information handling system; and retrieving data associated with the encoded geometry information.

A system, method, and computer-readable medium are disclosed for performing a physical part identification generation operation. The physical part identification generation operation generates parts with an encoded geometry that passively represents information. In certain embodiments, the encoded geometry of the physical part uniquely identifies the part. In certain embodiments, the encoded geometry comprises a plurality of multi-dimensional symbols (referred to as glyphs) which are combined to provide a unique multi-dimensional identifier. In certain embodiments, each multi-dimensional symbol is a three-dimensional symbol and the encoded geometry is a three-dimensional part comprising a plurality of the three-dimensional symbols. In certain embodiments, the unique multi-dimensional identifier is a passive part which is synthesized during production. In certain embodiments, the passive part is attached to a component being identified such as an information handling system. In certain embodiments, the passive part includes a bezel of the information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one of a physical part identification generation module 118 and a physical part detection module 120.

The physical part identification generation module 118 performs a physical part identification generation operation. The physical part identification generation operation generates physical parts with an encoded geometry that passively represents information. In certain embodiments, the encoded geometry of the physical part uniquely identifies the physical part. In certain embodiments, the encoded geometry comprises a plurality of multi-dimensional symbols (referred to as glyphs) which are combined to provide a unique multi-dimensional identifier. In certain embodiments, each multi-dimensional symbol is a three-dimensional symbol and the encoded geometry is a three-dimensional part comprising a plurality of the three-dimensional symbols. In certain embodiments, the unique multi-dimensional identifier is a passive part which is synthesized during production. In certain embodiments, the passive part is attached to a component being identified such as an information handling system. In certain embodiments, the passive part includes a bezel of the information handling system.

The physical part detection module 120 performs a physical part detection operation. The physical part detection operation module detects information encoded within an encoded geometry. In certain embodiments, the physical part detection operation includes decoding an encoded geometry, comprising: scanning an encoded geometry, the scanning comprising scanning a plurality of multi-dimensional symbols of the encoded geometry; identifying each of the plurality of multi-dimensional symbols; decoding each identifier multi-dimensional symbol to provide encoded geometry information; accessing an encoded geometry repository associating an encoded geometry with a unique identifier of an information handling system; and, retrieving data associated with the encoded geometry information.

Figure 2:
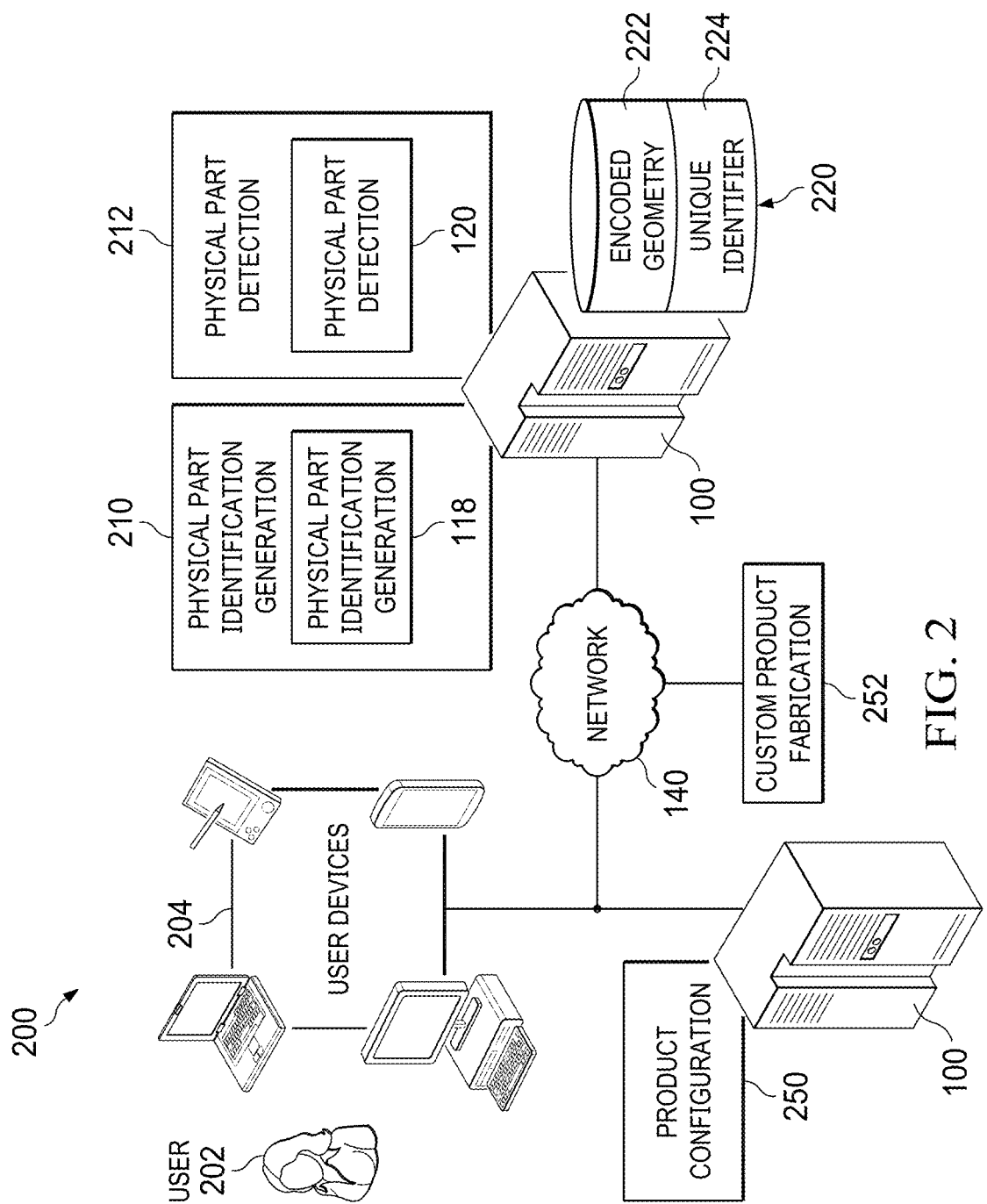
FIG. 2 shows a block diagram of a physical part identification environment.

FIG. 2 is a block diagram of a physical part identification environment 200 implemented in accordance with an embodiment of the invention. The physical part identification environment 200 includes at least one of a physical part identification generation system 210 as well as a physical part detection system 212.

In various embodiments, a user 202 generates a request to generate a unique encoded geometry. The request is received by the physical part identification generation system 210. In various embodiments, a physical part identification generation system 210 executes on a hardware processor 102 of an information handling system 100. In these and other embodiments, the user 202 may use a user device 204 to interact with at least one of the physical part identification generation system 210 and the physical part detection system 212.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device 204 is configured to present a physical part identification determination system user interface. In various embodiments, the physical part identification determination system user interface presents a list of physical parts automatically generated in response to a user query. In various embodiments, the user device 204 is used to exchange information between the user 202 and the physical part identification generation system 210 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the physical part identification generation system 210 includes a physical part identification generation module 118 which performs a physical part identification generation operation. In various embodiments, the physical part detection system 212 includes a physical part detection module 120 which performs a physical part detection operation. In various embodiments, the physical part identification environment 200 includes a storage repository 220. The storage repository may be local to the system executing the physical part identification generation module 118 or may be executed remotely. In various embodiments, the storage repository includes one or more of an encoded geometry repository 222 and a unique identifier repository 224.

In various embodiments, the physical part identification generation system 210 interacts with a product configuration system 250 which may be executing on a separate information handling system 100. In various embodiments, one or both of the physical part identification generation system 210 and the product configuration system 250 interact with a custom product fabrication system 252. In various embodiments, the custom product fabrication system 252 fabricates products to include components configured using the physical part identification generation system 210.

By digitally manufacturing the bezel or other physical part, the physical part identification generation operation provides flexibility to dynamically change the form of the bezel. When fabricated in a way that can be scanned, the bezel provides an aesthetic and structural multi-dimensional part that can also be used to store information like a service tag. The bezel becomes a storage device. This doesn't require any machine learning or processes such as applying an intrusive barcode. The part itself is the code and because it is multi-dimensional, the part has the potential to store even more useful information than traditional barcodes. A user can now approach a device having such a bezel and read the part to retrieve useful information. In certain embodiments, the part is read with the aid of an Augmented Reality device (e.g., an apparatus with the right sensors and computational power). Useful information may now be gathered by observing the part. This useful information can include configuration information of the information handling system, when the information handling system was produced, who ordered the information handling system, the service tag of the information handling system, what faults are associated with the information system, etc. In certain embodiments, the observation may be via scanning which uses cloud point data (such as three-dimensional cloud point data) which allows dynamic movement while scanning and can also be scanned in complete darkness.

In certain embodiments, the physical part identification generation operation generates a plurality (x) of aesthetic assemblies using a predefined multi-dimensional design language (i.e., a glyph language). In certain embodiments, the physical part identification generation operation provides a plurality of variations of the aesthetic assemblies through a machine learning operation. In certain embodiments, the machine learning operation can then generate new variations of aesthetic assemblies based off of the patterns created to provide the new variations with an inherited aesthetic appearance.

In certain embodiments, each of the plurality of multi-dimensional symbols represents a respective alphanumeric symbol. In certain embodiments, the alphanumeric symbol is represented as a series of binary bits (e.g., as three binary bits). In certain embodiments, the multi-dimensional symbols are arranged to represent a unique identifier. In certain embodiments, the unique identifier is associated with a serial number. In certain embodiments, the arrangement of multi-dimensional symbols represents information such as the product service tag, SKU, manufacturer, date of production, etc.

In certain embodiments of the physical part identification generation operation, the multi-dimensional symbols are physically synthesized into a geometry of an object via a generative computer aided design (CAD) application. In certain embodiments, the object is manufactured using digital manufacturing (such as 3D printing, CNC machining, etc.). Digital manufacturing provides flexibility in producing parts in a series much like bar codes. By producing parts this way, passive objects are generated which are computer legible without the need for additional identification information such as bar codes, QR codes, machine learning, etc. In certain embodiments, individual multi-dimensional symbols are produced using traditional molding or machining and then assembled in a specific order to represent a unique identifier. In certain embodiments, the multi-dimensional symbols are synthesized into structural and ornamental parts thus providing aesthetically pleasing, uniquely encoded parts. It will be appreciated that an object having a plurality of the multi-dimensional symbols can represent or associate more data than identifiers such as bar codes or QR codes.

Such a physical part identification generation operation forms physical parts which require no power to maintain or transmit data. Additionally, with such a physical part identification generation operation, parts are digitally encoded as they are produced such that the parts do not require additional labeling processes. Additionally, with such a physical part identification generation operation, the encoded parts can be fabricated having the same color and material as the main body of the item with which the part is associated, blending the encoded part into item. Additionally, with such a physical part identification generation operation, the encoded parts provide detectable contrast from the multi-dimensional form rather than contrast from tint and shade as with identifiers such as bar codes or QR codes. Additionally, with such a physical part identification generation operation, the encoded parts are more durable than a label. Additionally, with such a physical part identification generation operation, the encoded parts are structural and aesthetic parts that serve an additional function as a storage device (e.g., by providing information encoded into the part. Additionally, with such a physical part identification generation operation, the encoded parts are computer legible.

Figure 3:
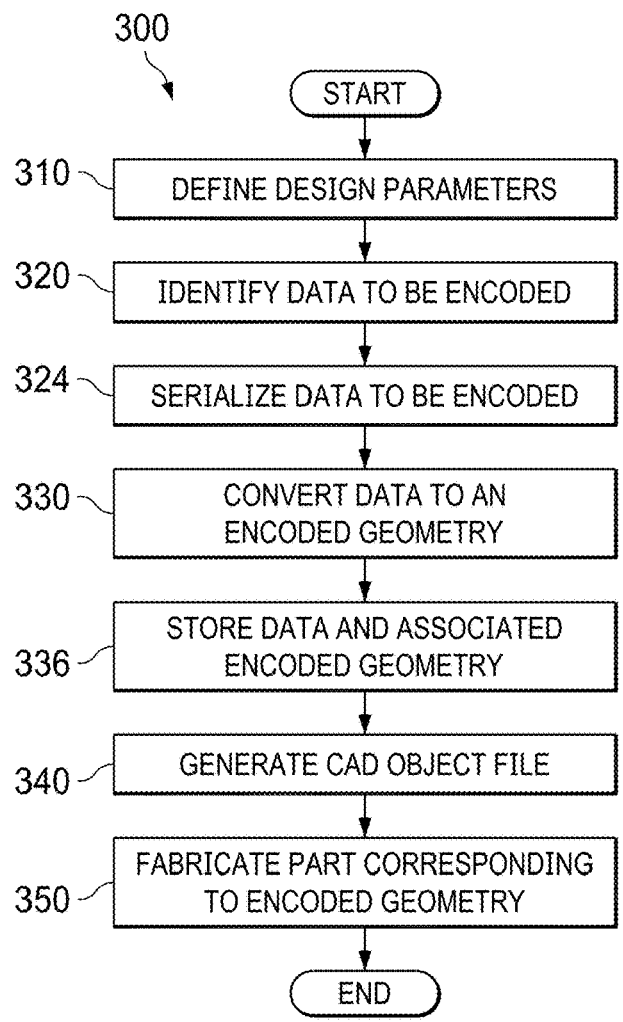
FIG. 3 shows a high level flow chart of a physical part identification generation operation.

FIG. 3 shows a high level flow chart of a physical part identification generation operation 300. More specifically, the physical part identification generation operation begins at step 310 by defining design parameters for the encoded geometry. In certain embodiments, the design parameters include one or both of aesthetic parameters and functional parameters such as strength, air flow through the geometry. Additionally, at step 320, data to be encoded within the physical part are identified. In certain embodiments, the data to be encoded can include one or more of a serial number, a service tag, a manufacturer identifier, a part identifier, etc. In certain embodiments, the data to be encoded is sequentially serialized for respective sequential encoded parts at step 324. Next at step 330, the data to be encoded is converted to an encoded geometry. In certain embodiments, the encoded geometry includes a plurality of multi-dimensional symbols. In certain embodiments, the data to be encoded and the associated encoded geometry are stored within an encoded geometry repository (such as repository 222) at step 336.

Next, at step 340 a generative computer aided design operation is performed using the design parameters and the encoded geometry. The generative computer aided design operation generates a CAD object file 345 which includes the encoded geometry. The CAD object file 345 is then used to digitally fabricate a multi-dimensional part with the encoded geometry corresponding to the design parameters and functional parameters at step 350. In certain embodiments, the multi-dimensional part is used when manufacturing a device such as an information handling system. In certain embodiments, the multi-dimensional part comprises a bezel of the information handling system.

Figure 4:
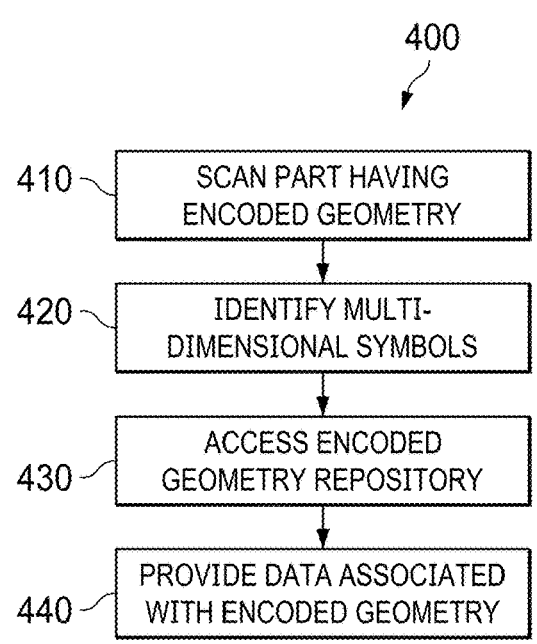
FIG. 4 shows a high level flow chart of a physical part detection operation.

FIG. 4 shows a high level flow chart of a physical part detection operation 400. The physical part detection operation 400 begins at step 410 by scanning a part having an encoded geometry. Next, each of the plurality of multi-dimensional symbols is identified at step 420. Next at step 430, the physical part detection operation 400 accesses the encoded geometry repository 222 to retrieve data that was associated with the encoded geometry. Next at step 440, the physical part detection operation provides the data that was associated with the encoded geometry.

Figure 5:
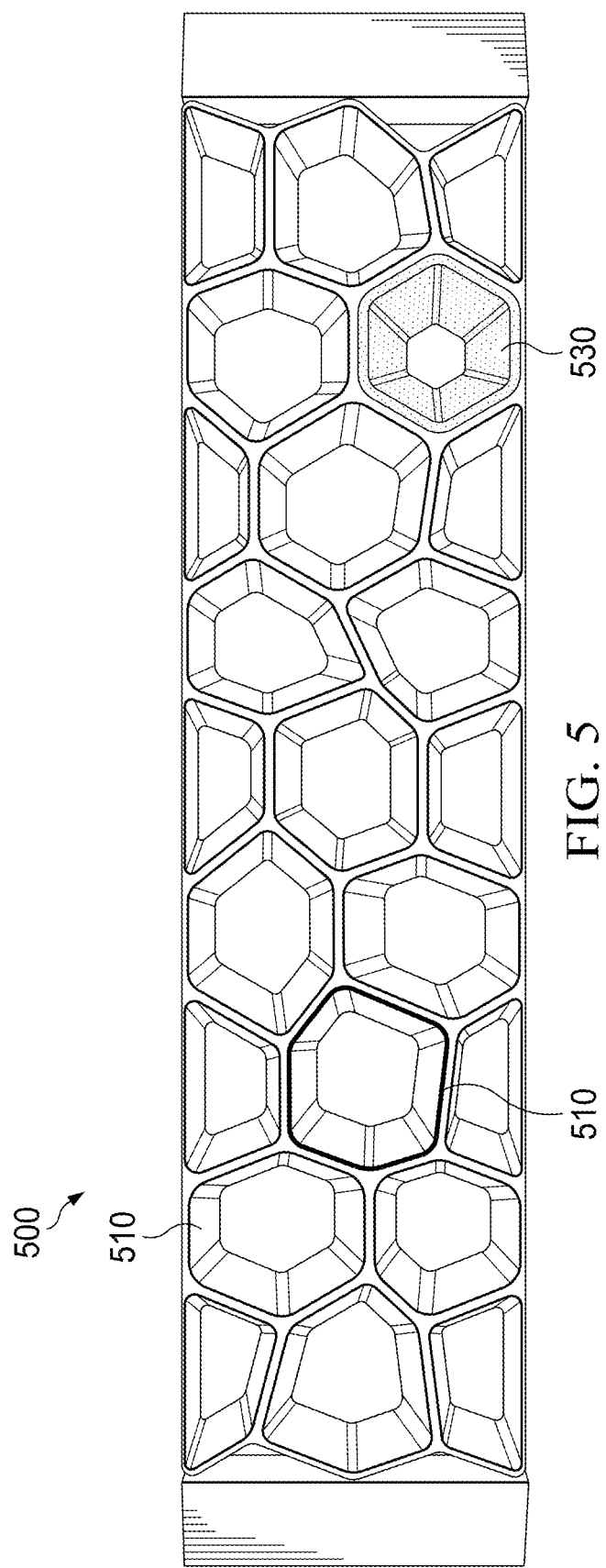
FIG. 5 shows a front view of an example encoded geometry.

Referring to FIG. 5, a front view of an example encoded geometry 500 is shown. In the example encoded geometry corresponds to a bezel of an information handling system. More specifically, the encoded geometry includes a plurality of multi-dimensional symbols 510 (i.e., glyphs). As used herein, a glyph may be defined as an elemental symbol within an agreed set of symbols intended to represent a readable character for the purpose of encoding and retrieving information. Also as used herein, a plurality of glyphs may be combined to collectively contribute to encoding and retrieving specific unique information to an information handling system, including components and configurations of the information handling system.

Some of the multi-dimensional symbols represent a plurality of constrained values. In certain embodiments, the plurality of constrained values for each glyph includes a two-dimensional value. In certain embodiments, the two-dimensional value is represented by a polygon. In certain embodiments, the polygon comprises a hexagon.

In certain embodiments, plurality of constrained values for each glyph also includes third-dimensional values. In certain embodiments, the third-dimensional values include a depth. In certain embodiments, the third-dimensional values include a slope associated with the depth.

In certain embodiments, at least one of the multi-dimensional symbols includes a fiducial marker symbol 530. In certain embodiments the fiducial marker system 530 includes a two-dimensional value. In certain embodiments, the two-dimensional value is represented by a polygon. In certain embodiments, the polygon comprises a hexagon. In certain embodiments, the two-dimensional value of the fiducial marker symbol 530 defines a regular hexagon (i.e., a hexagon that is both equilateral and equiangular). In certain embodiments, the fiducial marker includes third-dimensional values. In certain embodiments, the third-dimensional values include a depth. In certain embodiments, the third-dimensional values include a slope associated with the depth.

Figure 6:
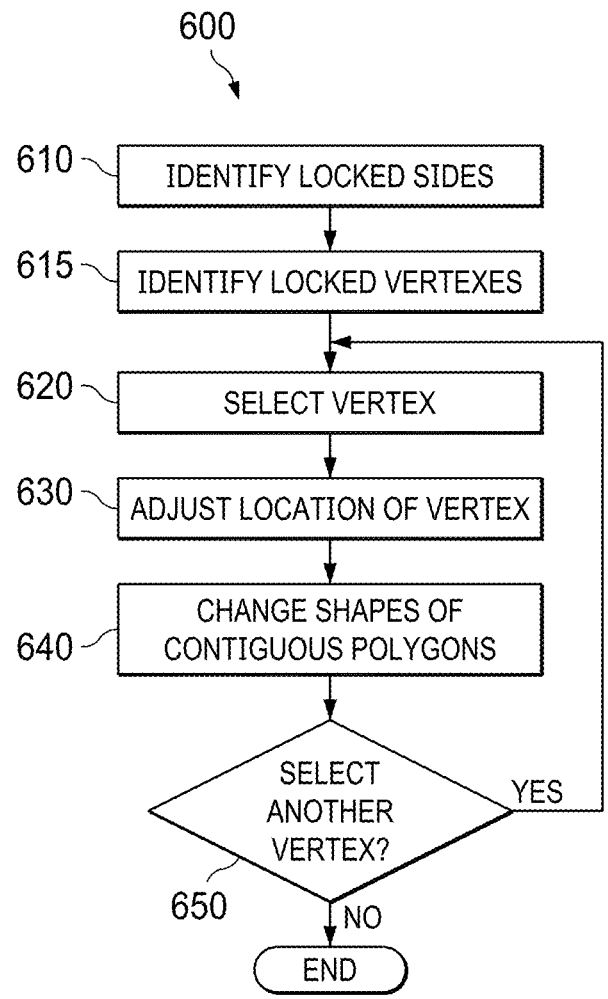
FIG. 6 shows a flow chart of a multi-dimensional encoded geometry generation operation.

Referring to FIG. 6, a flow chart of a multi-dimensional encoded geometry generation operation 600 is shown. More specifically, the multi-dimensional generation operation starts at step 610 by identifying locked sides. Next at step 615, the multi-dimensional generation operation identifies locked vertices. Next, at step 620 at least one vertex of one of the polygons within the encoded geometry is selected. Next, at step 630, the location of the selected vertex is adjusted causing the polygon to change shape producing a warped polygon. Next, at step 640, by changing the shape of the polygon associated with the vertex, the shapes of contiguous polygons are also changed producing a plurality of warped polygons. Next, at step 650, the multi-dimensional generation operation 600 determines whether to select another vertex for adjustment. If so, then the multi-dimensional generation operation 600 returns to step 620. If not, then the multi-dimensional generation operation completes.

Figure 7:
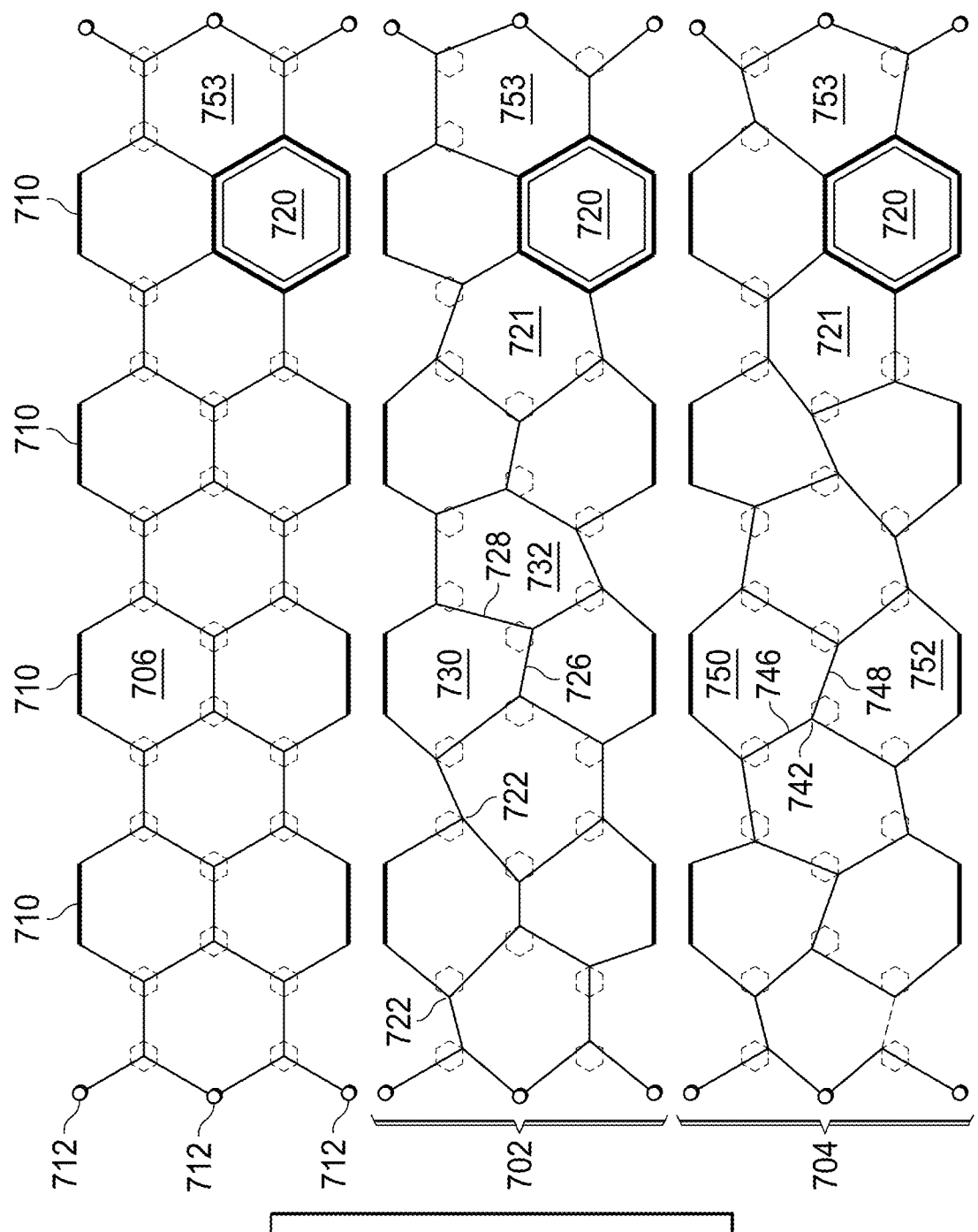
FIG. 7 shows line drawing views of example encoded geometries.

Referring to FIG. 7, line drawing views of example encoded geometries 700, 702, 704 are shown. More specifically, the example encoded geometry 700 includes a plurality of regular hexagonally shaped glyphs 706. The example encoded geometry 700 includes a plurality of locked sides 710. For the purposes of this disclosure, a locked side may be defined as a side of a polygon which remains unchanged even when a location of a vertex within the encoded geometry is changed. The example encoded geometry 700 also includes a plurality of locked points 712. For the purposes of this disclosure, a locked point may be defined as a point within the encoded geometry which remains unchanged even when a location of a vertex within the encoded geometry is changed. It will be appreciated that providing one or both of locked sides and locked points contribute to the aesthetic parameters and functional parameters of the encoded geometry. In certain embodiments, at least some of the locked lines and locked points provide a fiducial marker symbol 720.

The example encoded geometry 702 includes a plurality of hexagonally shaped glyphs 721 after the locations of certain vertexes 722 have been adjusted. Adjusting the location of a particular vertex 722 automatically adjusts the locations of the sides 726, 728 of the hexagon associated with that vertex 722. Because these sides 726, 728 also form a part of two contiguous hexagons 730, 732, the shape of these hexagons is also adjusted when the location of the particular vertex is adjusted.

The example encoded geometry 704 includes a plurality of hexagonally shaped glyphs 721 after the locations of certain vertexes 742 have been adjusted. Adjusting the location of a particular vertex 742 automatically adjusts the locations of the sides 746, 748 of the hexagon associated with that vertex 742. Because these sides 746, 748 also form a part of two contiguous hexagons 750, 752, the shape of these hexagons is also adjusted when the location of the particular vertex is adjusted. In certain embodiments, the encoded geometry does not include a fiducial marker symbol 720. In these embodiments, an additional hexagonally shaped glyph 753 can also be adjusted to provide an additional encoded hexagon.

Figure 8A:
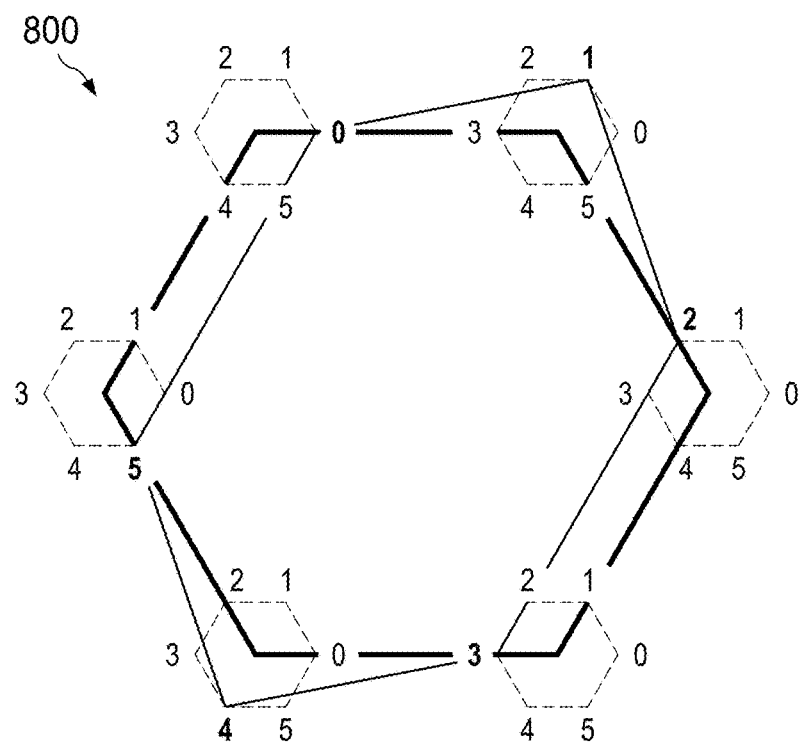
FIG. 8A shows a line drawing showing an example of how a glyph may be encoded.

Referring to FIG. 8A, a line drawing showing an example of how a glyph 800 may be encoded is shown. More specifically, each vertex of the glyph 800 may be set to one of seven values. Six of the values represent a location to which the vertex may be adjusted while the seventh value represents an unadjusted location (i.e., the location of the vertex were the hexagon a regular hexagon). By adjusting the locations of the vertexes, a single glyph can represent six numbers, each having six possible locations.

Figure 8B:
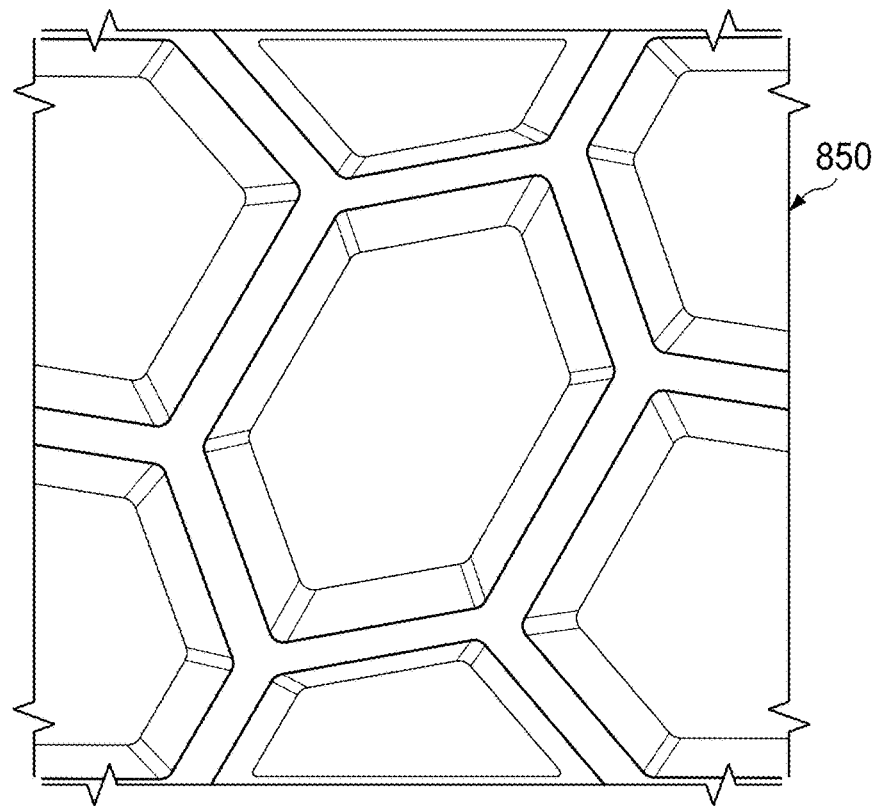
FIG. 8B shows an example of a physical glyph corresponding to the glyph encoded according to the line drawing of FIG. 8A.

Accordingly, a single hexagonal glyph can encode and passively represent more than 46656 different number combinations. FIG. 8B shows an example of a physical glyph 850 corresponding to the glyph encoded with each of six vertexes set to one of six values. It will be appreciated that in certain embodiments, some or all of the glyphs can use some or all of the unadjusted vertex locations. With the addition of the unadjusted vertex locations to each vertex, each vertex can be represented as one of seven values. In these embodiments, a single hexagonal glyph can represent 117,649 different combinations.

Figure 9:
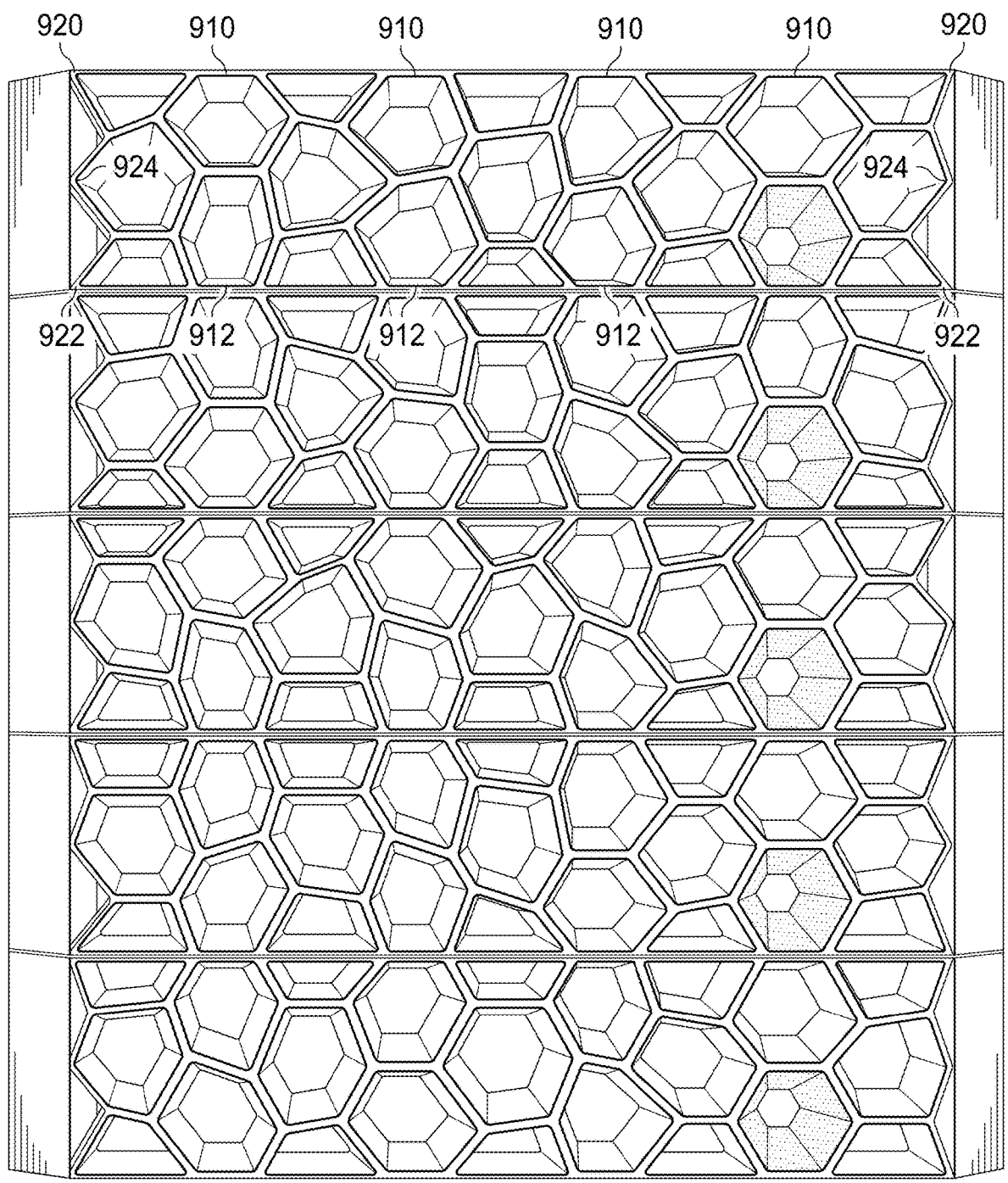
FIG. 9 shows a front view of a plurality of example encoded geometries.

Referring to FIG. 9, a front view of a plurality of example encoded geometries is shown. In the example, encoded geometries correspond to bezels of information handling systems mounted within a rack. Each bezel is generated by the physical part identification generation operation. Each bezel has a different encoded geometry where at least one input value (e.g., at least one vertex of at least one glyph) of each encoded geometry is different.

The front view of the plurality of example encoded geometries also shows an aesthetic advantage to having locked lines and vertexes when generating the encoded geometry. More specifically, because the top lines 910 and bottom lines 912 of a particular encoded geometry are locked, when the information handling systems are mounted within a rack, the top lines 910 of one encoded geometry align with the bottom lines 912 of a next higher encoded geometry. Additionally, the bottom lines 912 of one encoded geometry align with the top lines 910 of a next lower encoded geometry, providing an aesthetically pleasing substantially continuous appearance across the mounted information handling systems. Additional, because the top vertexes 920 and bottom vertexes 922 of a particular encoded geometry are locked, when the information handling systems are mounted in a rack, the top vertexes 920 of one encoded geometry align with the bottom vertexes 922 of a next higher encoded geometry. Additionally, the bottom vertexes 922 of one encoded geometry align with the top vertexes 920 of a next lower encoded geometry, providing an aesthetically pleasing substantially continuous appearance across the mounted information handling systems. Additionally, a third vertex 924 on each side of the encoded geometry is located equidistant from the top vertex 920 and bottom vertex 922.

Figure 10:
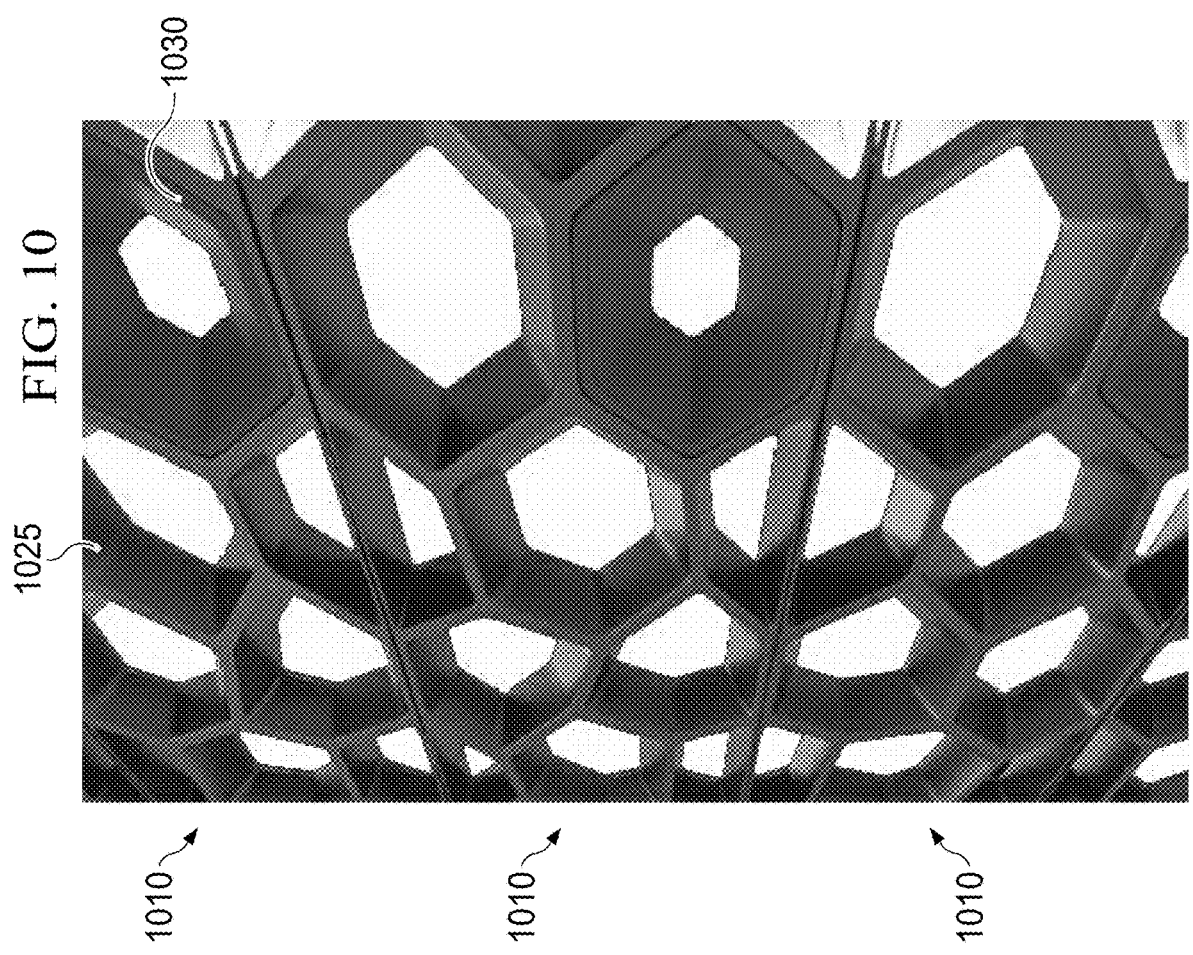
FIG. 10 shows a perspective view of portions of a plurality of encoded geometries.

Referring to FIG. 10, a perspective view of portions of a plurality of encoded geometries is shown. More specifically, each respective portion 1010 of an encoded geometry includes a plurality of multi-dimensional symbols 1025. In certain embodiments, each of the plurality of multi-dimensional symbols is a respective glyph. Also, in certain embodiments, each encoded geometry includes a respective fiducial multi-dimensional symbol 1030. The fiducial multi-dimensional symbol 1030 provides a fixed basis of comparison when performing a physical part detection operation (such as the physical part detection operation 400). Such encoded geometries provide computer legibility of aesthetic or structural forms without the need for labeling or machine learning. In various embodiments, each encoded geometry is associated with a component. In certain embodiments, each encoded geometry is attached to a respective component.

It will be appreciated from the perspective view, that each of the plurality of multi-dimensional symbols 1025 includes a plurality of variations. In various embodiments, the plurality of variations includes a front two-dimensional variation, a rear two-dimensional variation, and a slope variation (i.e., the slope from the front of the multi-dimensional system 1025 to the rear of the multi-dimensional symbol 1025. It will be appreciated that in certain embodiments, the slope variation may be different for each side of the multi-dimensional symbol 1025. In certain embodiments, the plurality of variations is detected by detecting information regarding the lines and vertices of each multi-dimensional symbol. In certain embodiments, detecting information regarding the vertices of the multi-dimensional symbol includes detection of the location of each vertex of the multi-dimensional symbol. In certain embodiments, detecting information regarding the lines of the multi-dimensional symbol includes detection of a length of each line of the multi-dimensional symbol. In certain embodiments, detecting information regarding the lines of the multi-dimensional symbol includes detection of an angle at a vertex defined by two lines of the multi-dimensional symbol.

It will also be appreciated from the perspective view, that the encoded geometry provides dynamic legibility. For the purposes of this disclosure, dynamical legibility may be defined as a detection of a three-dimensional form (e.g., the encoded geometry) which can present different information depending on a perspective variable or a proximity variable when performing the detection. The proximity variable provides a certain resolution of the encoded geometry while the perspective variable shows a specific angle of the encoded geometry. Changing either of these variables provides a detection device with different inputs, which can provide different or additional decoded data.

Figure 11:
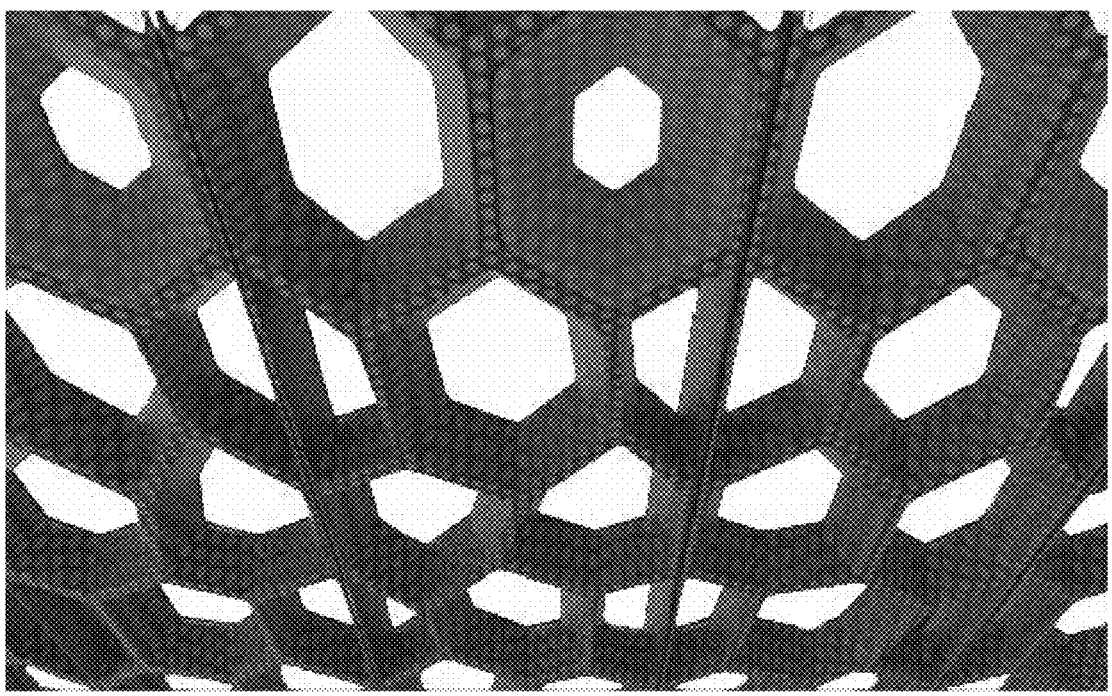
FIG. 11 shows a depth scanning representation from scanning of portions of a plurality of encoded geometries.

Referring to FIG. 11, a depth scanning representation from scanning of portions of a plurality of encoded geometries is shown. In certain embodiments, the physical part detection operation decodes each multi-dimensional symbol into a legible character or string of characters (i.e., a character or string of characters that is readable by a user). In certain embodiments, when performing the physical part detection operation, a depth scanning operation is performed. In certain embodiments, the depth scanning operation is performed using a three-dimensional scanning device. For the purposes of this disclosure, a three-dimensional scanning device is a device that analyzes the plurality of multi-dimensional symbols 1025 of the encoded geometry and collects data on the shape of each of the plurality of multi-dimensional symbols 1025 of the encoded geometry, including a depth or slope. In certain embodiments, the scanning device also collects data on the appearance of the encoded geometry including the color of each of the multi-dimensional symbols. In certain embodiments, the depth scanning device produces dot patterns for each of the plurality of multi-dimensional systems 1025. In certain embodiments, the dot patterns may be produced based onto infrared (IR) dot patterns.

When performing the physical part detection operation, once the data on the shape of each of the plurality of multi-dimensional symbols is collected, this data can be analyzed and used to retrieve data that was associated with the encoded geometry. Thus, the encoded geometry provides a passive storage device via which information associated with the encoded geometry may be retrieved.

In certain embodiments, the three-dimensional scanning device includes a structured-light three-dimensional scanning device. In operation, the structured-light three-dimensional scanning device projects a band of light onto the encoded geometry to produce a line of illumination that appears distorted from other perspectives from that of the projected light. This distorted line of illumination can then be used to produce geometric information regarding the encoded geometry. This geometric information is then used to exact geometric reconstruction of the shape of the encoded geometry.

Figure 12:
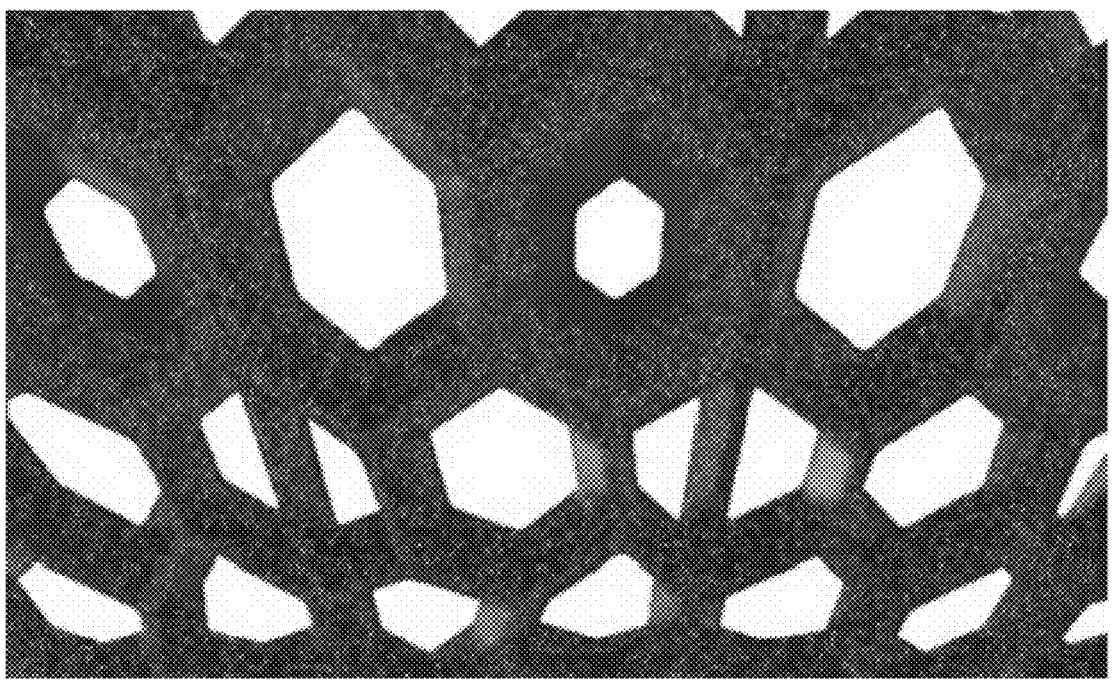
FIG. 12 shows a cloud point data representation from scanning of portions of a plurality of encoded geometries.

Referring to FIG. 12, a cloud point data representation from scanning of portions of a plurality of encoded geometries is shown. In certain embodiments, when performing the depth scanning operation, point cloud data is generated. For the purposes of this disclosure, point cloud data comprises a set of data points in a predefined multi-dimensional coordinate system. In certain embodiments, the predefined multi-dimensional coordinate system comprises a three-dimensional coordinate system where the set of data points are defined by X, Y and Z coordinates to represent the external surface of each of the plurality of multi-dimensional symbols. The set of data points can then be used to provide an associated three-dimensional rendering of each of the plurality of multi-dimensional symbols. The three-dimensional renderings may then be analyzed to identify information associated with the multi-dimensional symbol. In certain embodiments, the analysis is performed by the physical part detection module 212.

Figure 13:
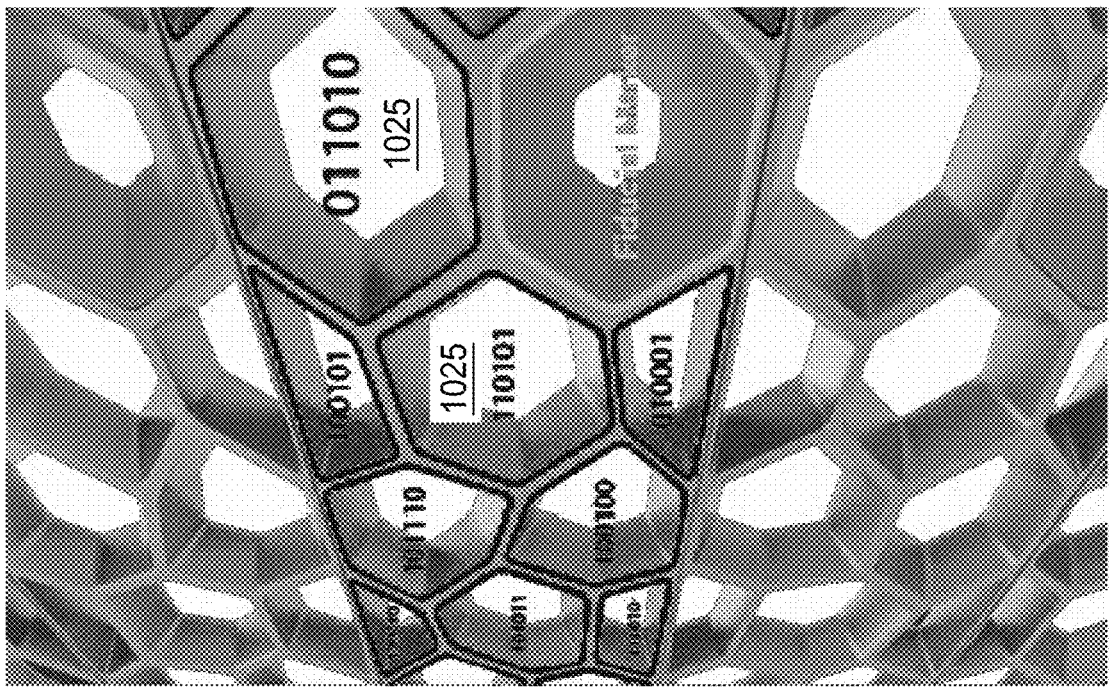
FIG. 13 shows an overlay representation of information obtained from scanning of portions of a plurality of encoded geometries.

Referring to FIG. 13, an overlay representation of information obtained from scanning of portions of a plurality of encoded geometries is shown. When performing the physical part detection operation, once the data on the shape of each of the plurality of multi-dimensional symbols is collected, this data can be used to retrieve data that was associated with the encoded geometry. For example, each of the plurality of multi-dimensional symbols 1025 has an associated value. In certain embodiments, the associated value comprises a multi-bit representation. In certain embodiments, the multi-bit representation comprises a 6-bit binary representation. The combination of the plurality of multi-bit representations provides unique, passively encoded information. In certain embodiments, the unique passively encoded information is used to access information associated with the value from an encoded geometry repository. Thus, the encoded geometry provides a passive storage device via which information associated with the encoded geometry may be retrieved.

Figure 14:
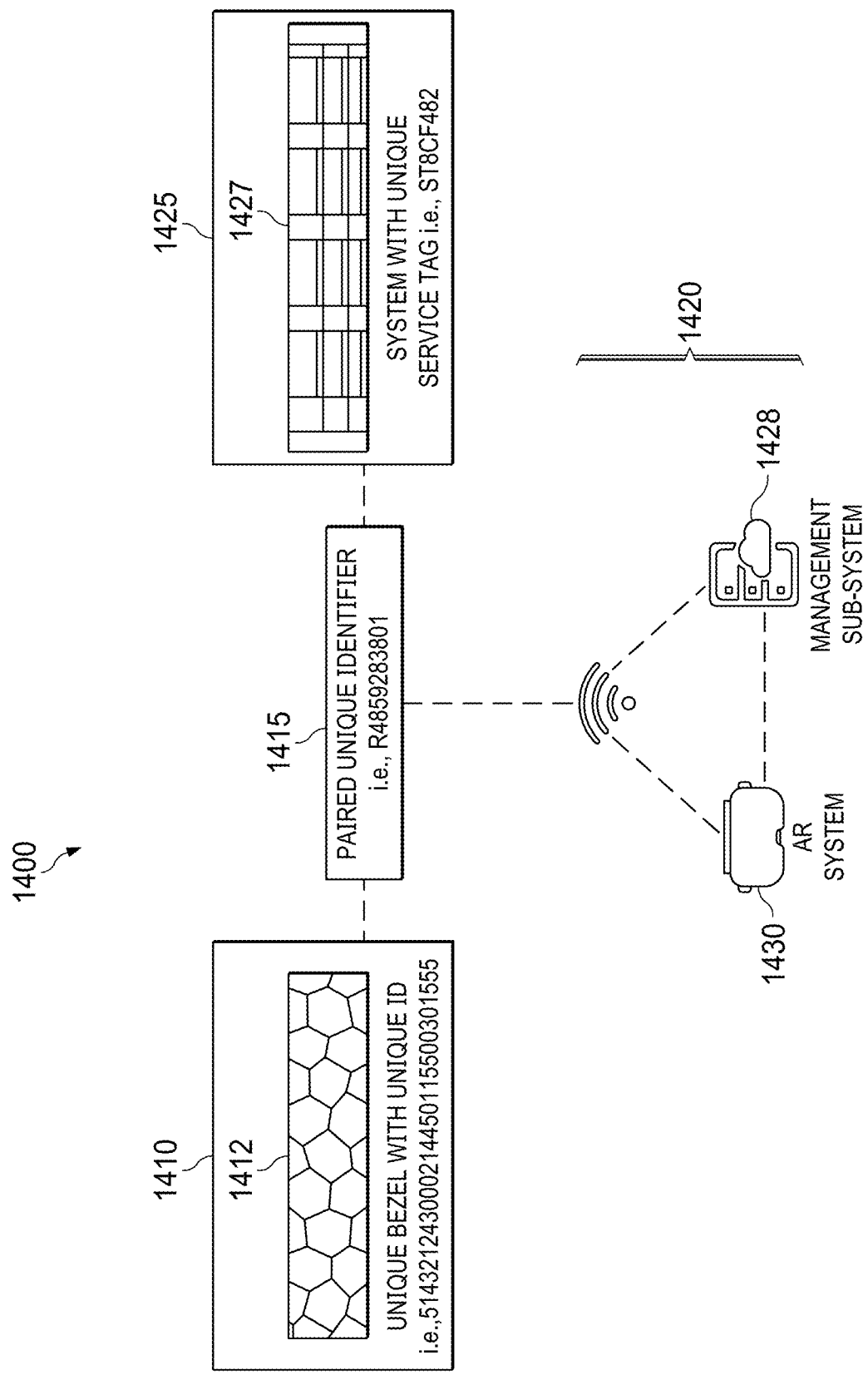
FIG. 14 shows a block diagram of system identification operation using an encoded geometry.

Referring to FIG. 14, a block diagram of system identification operation 1400 using an encoded geometry is shown. More specifically, an information handling system 1410 is configured to include a unique encoded geometry 1412. An encoded geometry management system 1420 pairs a unique identifier of the information handling system 1410 with the unique encoded geometry 1412. In certain embodiments, the unique identifier 1415 of the information handling system 1410 corresponds to a system 1425 with a unique service tag 1427. In certain embodiments, a management subsystem 1428 of the encoded geometry management system 1420 communicates with an Augmented Reality (AR) system 1430. In certain embodiments, the AR system 1430 comprises AR googles. For the purposes of this disclosure, augmented reality may be defined as a technology that superimposes a computer-generated image on a user's view of the real world, thus providing a composite view. In certain embodiments, the AR system 1430 interacts with the management subsystem 1428 to retrieve information regarding the information handling system 1410 corresponding to the unique identifier 1415 paired with the unique encoded geometry 1412. In certain embodiments, either the management system 1428 or the AR system 1430 receives information, such as performance information, from other sources within the environment in which the information handling system 1410 resides. In certain embodiments, the other sources include a server or datacenter performance analysis tool such as the Live Optics performance analysis tool available from Dell Technologies, Inc.

In operation, the encoded geometry management system 1420 facilitates retrieval of the unique identifier 1415 of the information handling system 1410 using the multi-dimensional symbols of the encoded geometry. In certain embodiments, one or more of the scanning and identification of the encoded geometry is performed by the AR system 1430.

Figure 15:
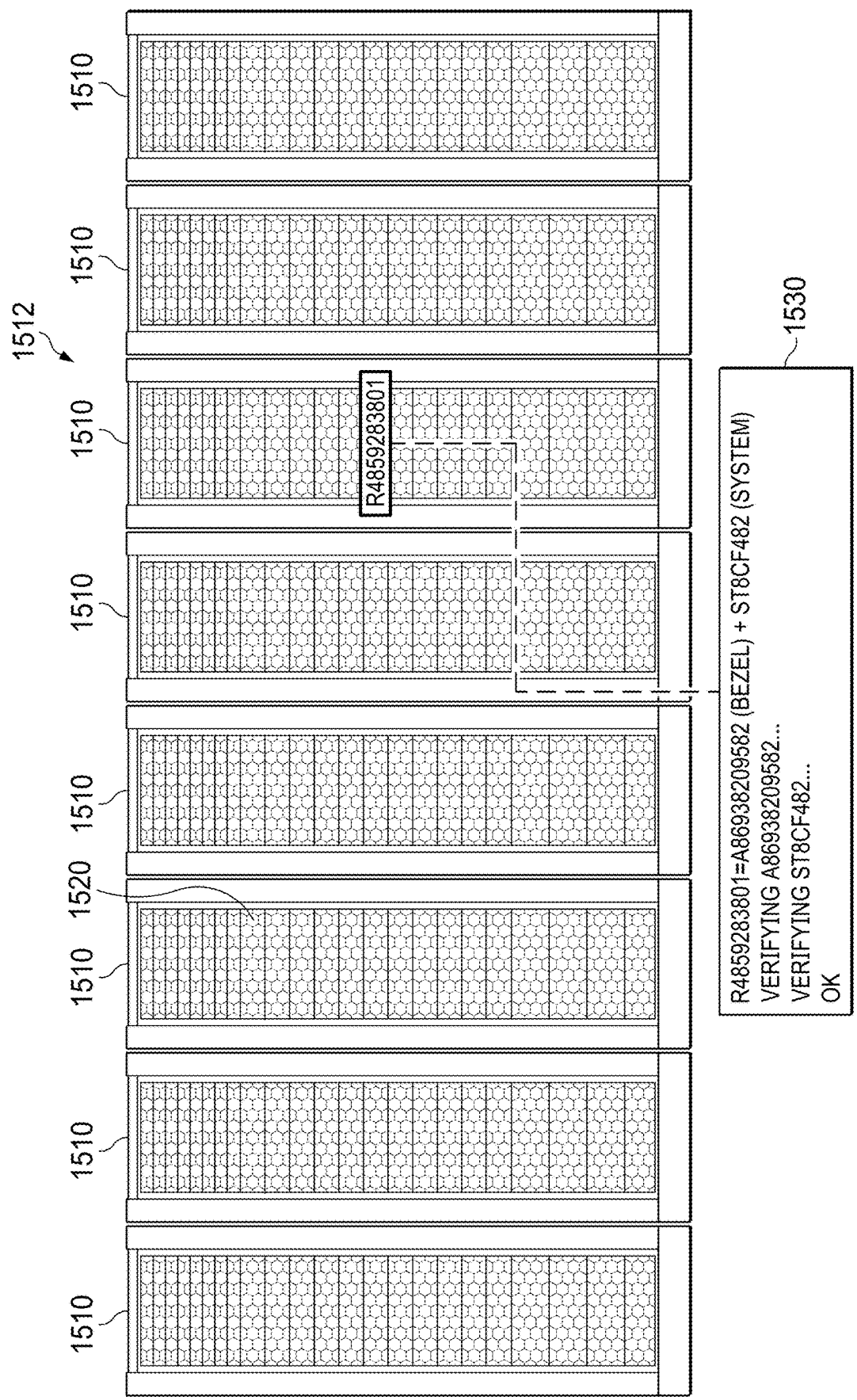
FIG. 15 shows a diagrammatic representation of a plurality of server systems having respective encoded geometries.

Referring to FIG. 15, a diagrammatic representation of a plurality of server systems having respective encoded geometries is shown. In certain embodiments, the plurality of server systems 1510 are configured within a data center 1512. In certain embodiments, some or all of the plurality of server systems 1510 include respective unique encoded geometries 1520. In certain embodiments, each of the plurality of server systems 1510 may be identified using their respective unique encoded geometry.

In certain embodiments, a server system identification operation is performed by scanning the unique encoded geometry associated with a physical part. In certain embodiments, the encoded geometry management system 1420 performs a verification operation 1530 when performing the server system identification operation. In certain embodiments, the server system verification operation verifies that a unique system identifier (for example R4859283801) is associated with the correct identification number for a physical part (for example A86938209582 associated with a bezel) and the correct information for a system (for example ST8CF482).

Figure 16:
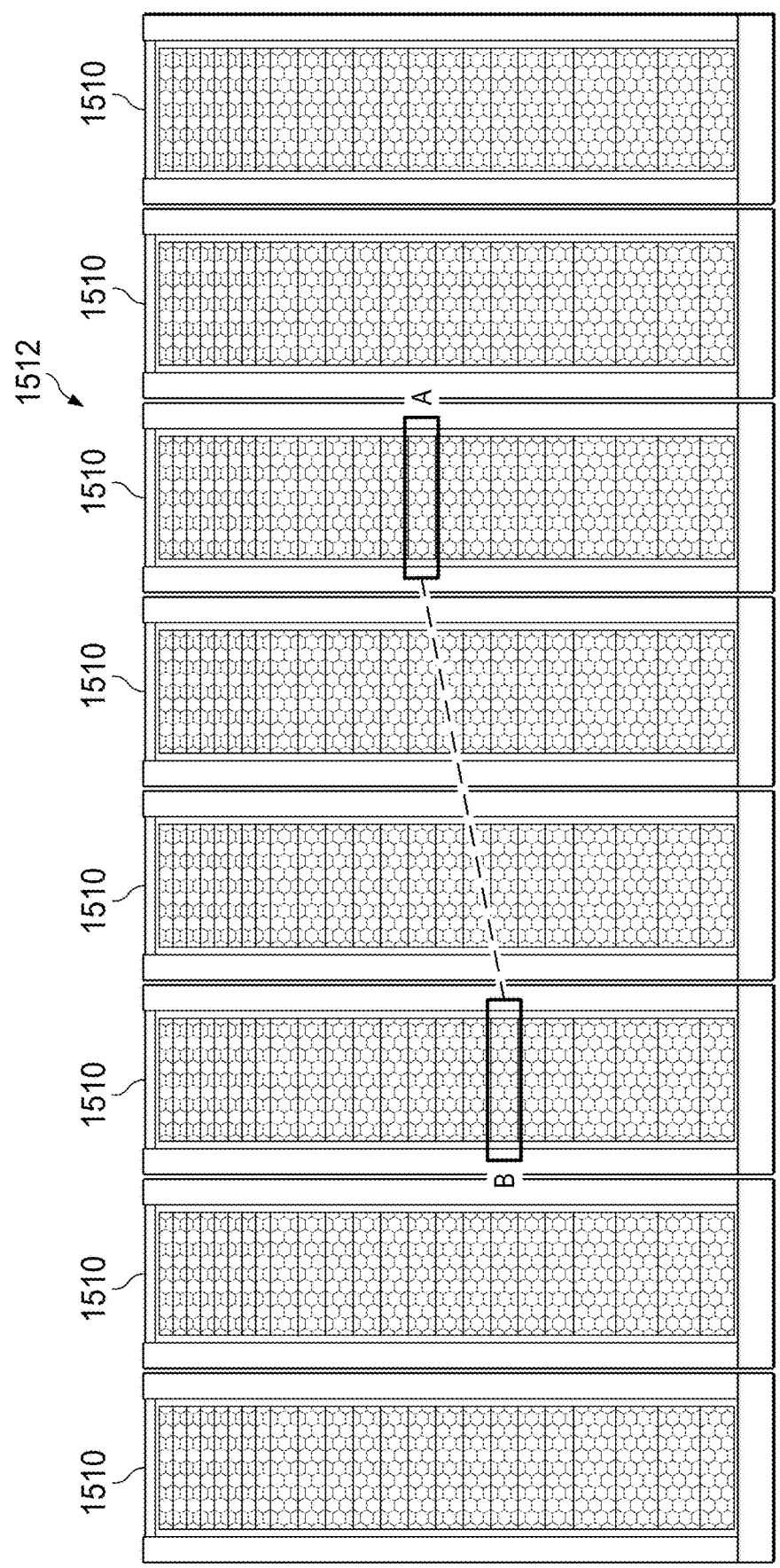
FIG. 16 shows a diagrammatic representation of a plurality of server systems having respective encoded geometries.

Referring to FIG. 16, a diagrammatic representation of a plurality of server systems 1510 having respective encoded geometries is shown. In certain embodiments, analyzing a plurality of server systems may determine that one or more encoded geometries previously associated with a unique system identifier are inconsistent with information in a previously associated unique system identifier. For example, in certain embodiments, the encoded geometries are configured as individually removable bezels. In the example shown in FIG. 16, one or more of the bezel associated with information handling system A and the bezel associated with information handling system B does not match information stored in a repository such as memory 106 or repository 220.

Figure 17:
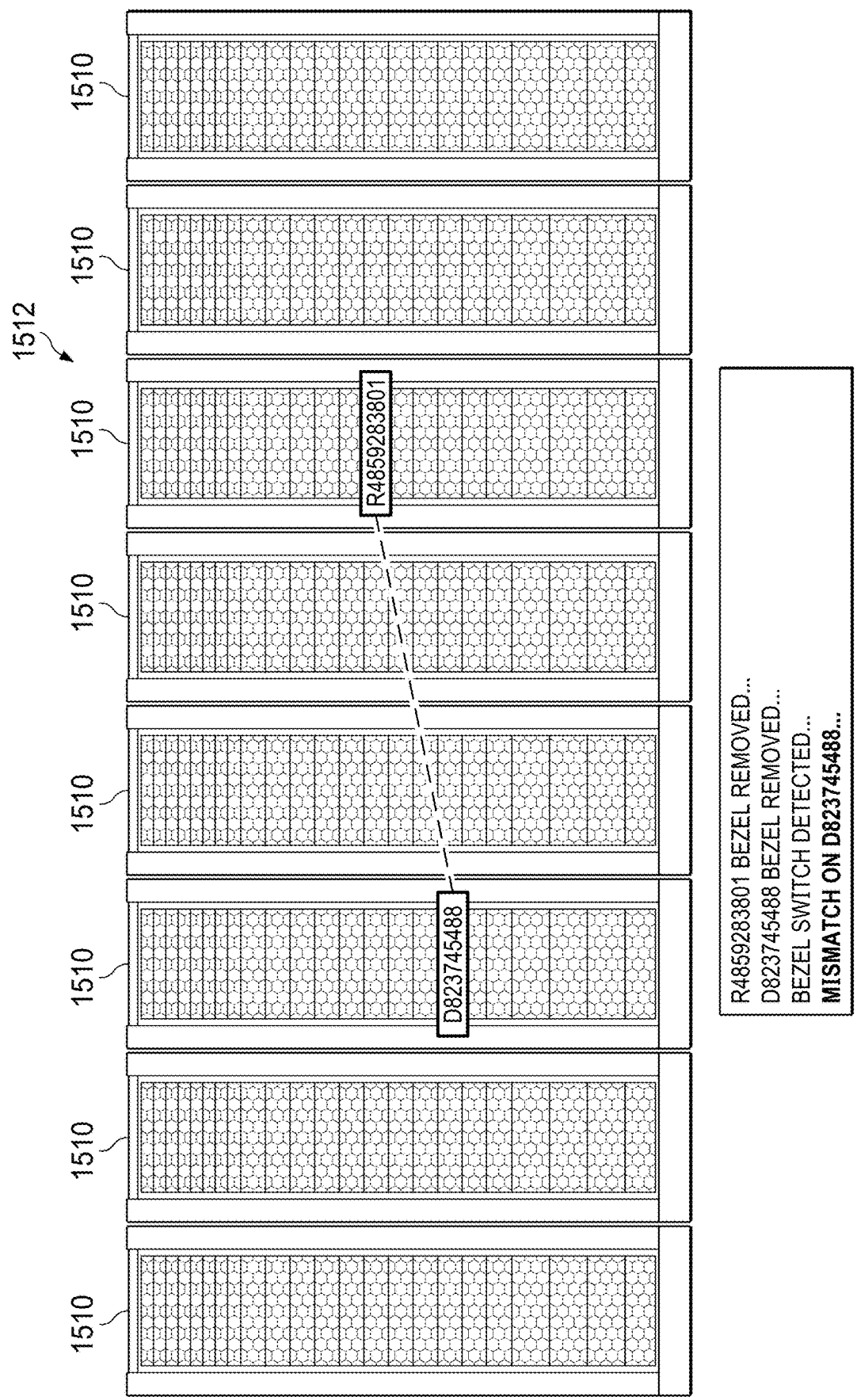
FIG. 17 shows a diagrammatic representation of a plurality of server systems along with the result of decoding some of the encoded geometries.

Referring to FIG. 17, a diagrammatic representation of a plurality of server systems 1510 along with the result of decoding some of the encoded geometries is shown. In certain embodiments, certain encoded geometries or physical parts may be switched such that an encoded geometry is present but no longer associated with a previously configured unique system identifier. For example, in certain embodiments, the encoded geometries are configured as individually removable bezels. In these embodiments, the bezel associated with information handling system A might be switched with the bezel associated with information handling system B, and a server system identification operation may determine there is a mismatch.

Accordingly, when a verification operation is performed, the encoded geometry management system 1420 would determine that the bezels are no longer associated with their previously associated unique system identifiers. This determination may be made by performing a proximity analysis operation. In certain embodiments, the proximity analysis operation reads the unique encoded geometries of one or more proximate geometries or devices. For example, the proximity analysis operation could read the encoded geometries for one or more contiguous encoded geometries. By decoding the encoded geometries of the contiguous encoded geometries, the encoded geometry management system 1420 can determine that the encoded geometry associated with information handling system A has been switched with the encoded geometry associated with information handling system B. The encoded geometry management system 1420 can then update the encoded geometry repository to reflect the new association of the encoded geometries.

Figure 18:
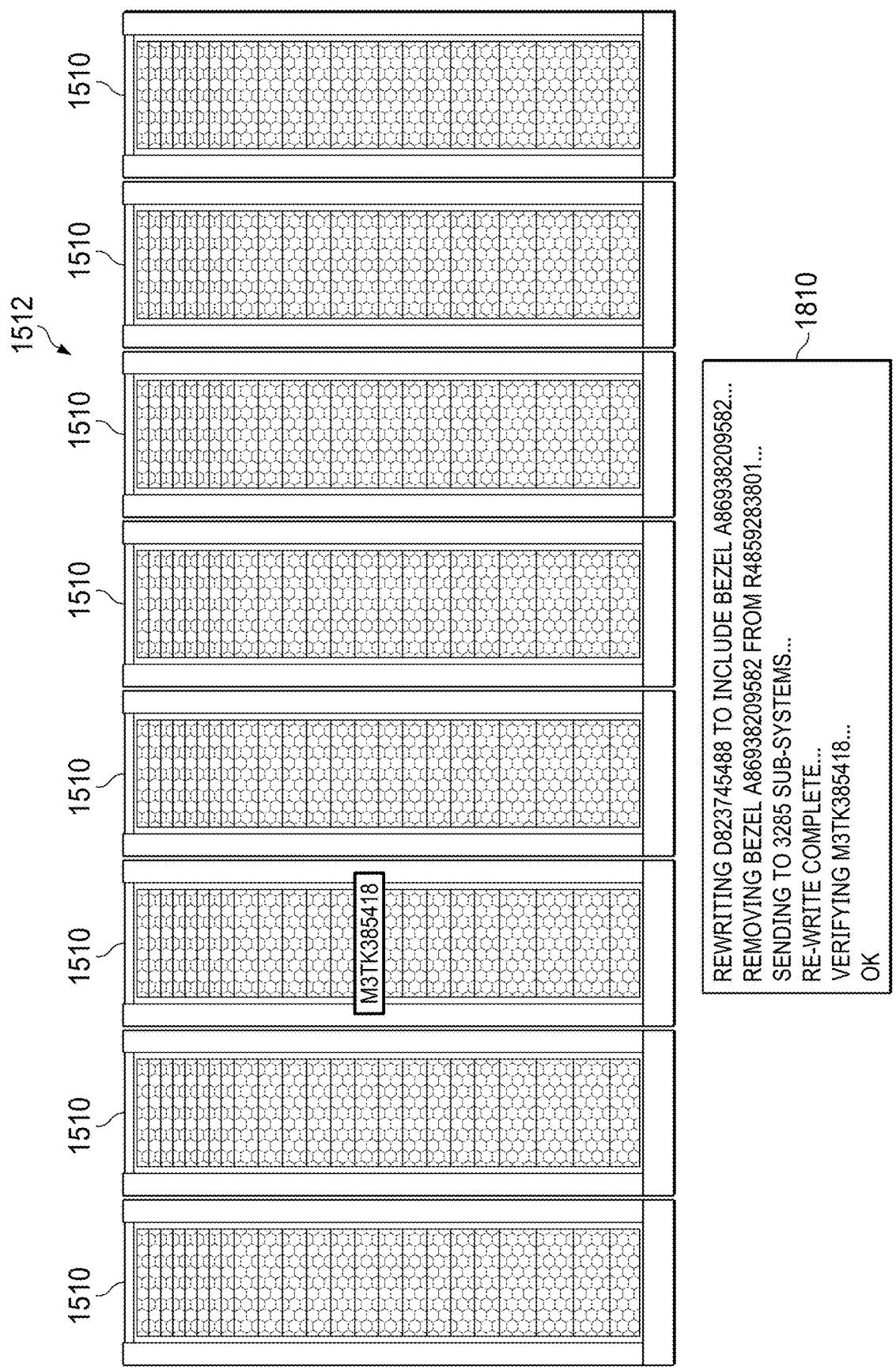
FIG. 18 shows a diagrammatic representation of a plurality of server systems along with a rewriting of an association of a server system with a particular encoded geometry.

Referring to FIG. 18, a diagrammatic representation of a plurality of server systems 1510 along with a rewriting of an association of a server system with a particular encoded geometry is shown. When a server system identification operation is performed, the encoded geometry management system 1420 may determine that a unique identifier associated with a bezel is no longer associated with the bezel and may execute a set of instructions to associate a new unique system identifier 1415 with the bezel, such as by rewriting a unique identifier to the bezel, removing the previous unique identifier from the bezel, sending the update information to subsystems in the server, verifying the information has been updated and storing the updated information in a repository as needed.

Figure 19:
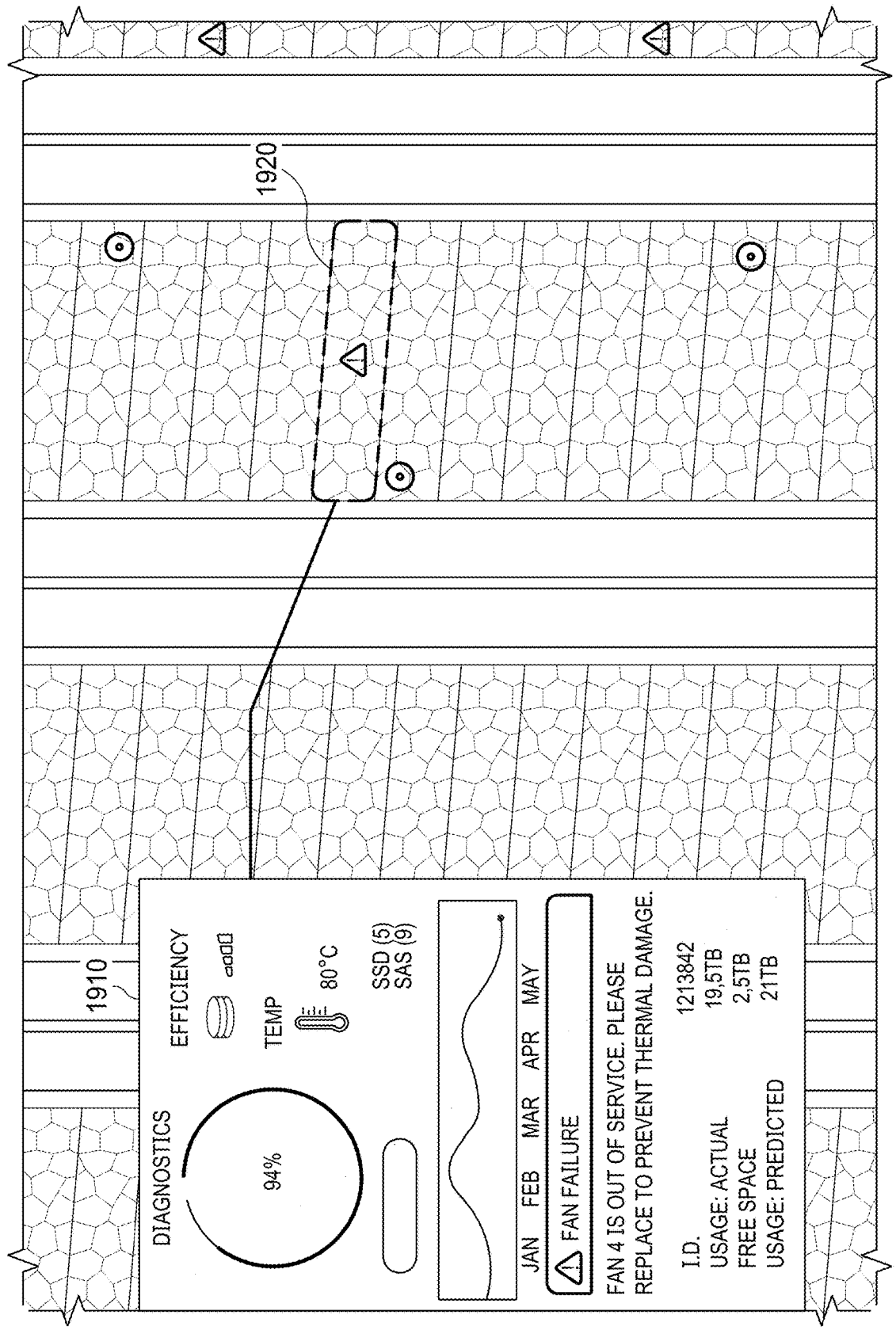
FIG. 19 shows a diagrammatic representation of an augmented reality encoded geometry screen presentation operation.

Referring to FIG. 19, a diagrammatic representation of an augmented reality encoded geometry screen presentation is shown. The augmented reality encoded geometry screen presentation includes a performance data screen presentation 1910 superimposed on a user's view of the environment in which the physical part is located thus providing a composite view. In certain embodiments, when an encoded geometry is scanned, performance data associated with a physical part is retrieved and presented via the performance data screen presentation 1910. Performance data may include the amount of memory used or available, the efficiency of the physical part, temperature, and any service or maintenance codes, and can include historical data and predicted data. In addition, an overlay 1920 allows a user to immediately identify what physical parts or systems need attention.

Figure 20:
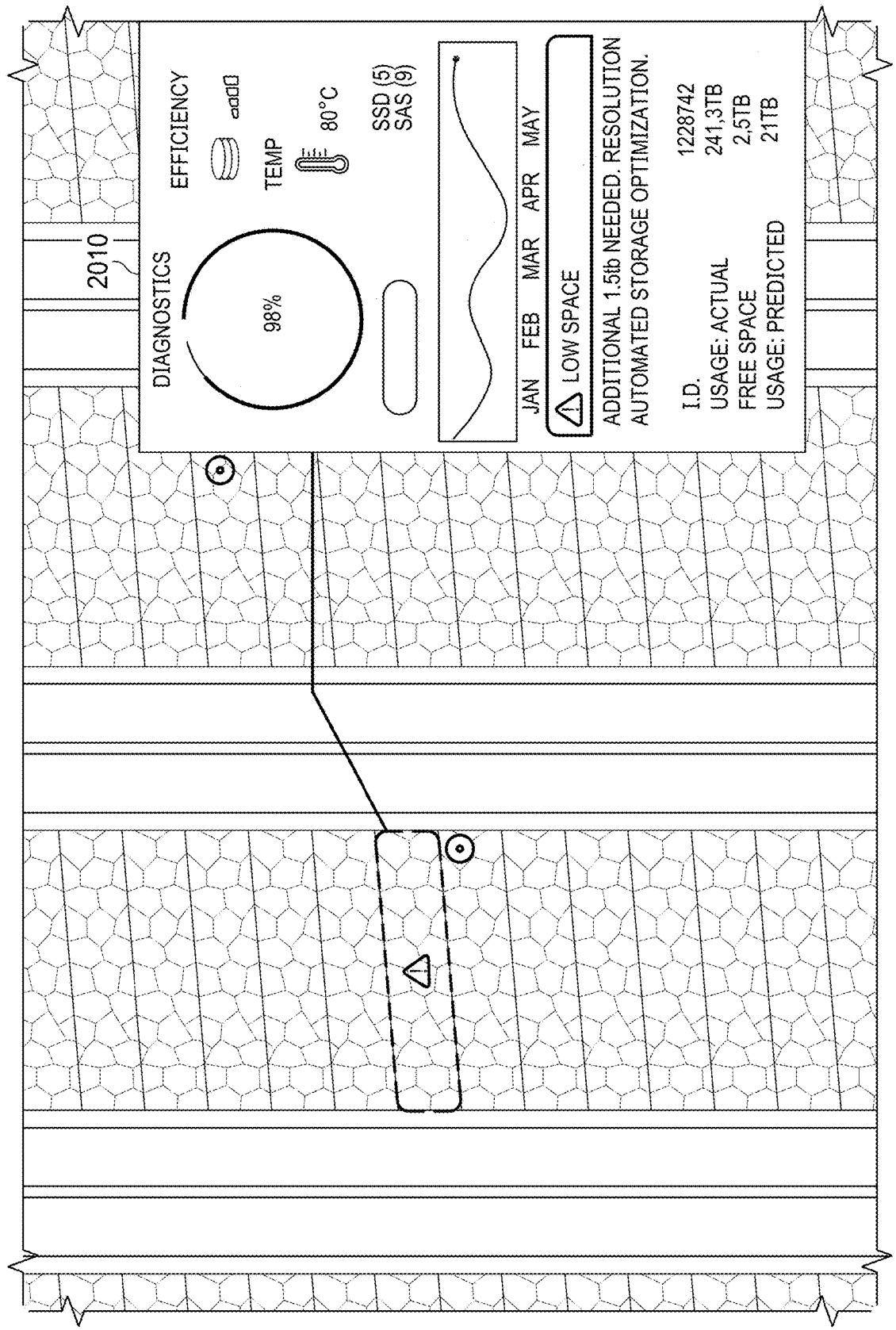
FIG. 20 shows another diagrammatic representation of an augmented reality encoded geometry screen presentation operation.

FIG. 20 shows another diagrammatic representation of an augmented reality encoded geometry screen presentation. The augmented reality encoded geometry screen presentation includes a solution screen presentation 2010 superimposed on a user's view of the environment in which the physical part is located thus providing a composite view. In certain embodiments, when an encoded geometry is scanned and performance data is analyzed, a solution may be presented via the solution screen presentation 2010. In certain embodiments, information stored in product configuration system 250 may be compared to identify a set of possible components or configurations or a set of undesired components or configurations.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for decoding an encoded geometry, comprising:
scanning the encoded geometry, the scanning comprising scanning a plurality of multi-dimensional symbols of the encoded geometry, each of the plurality of multi-dimensional symbols representing a plurality of constrained values, each of the plurality of constrained values including a two-dimensional value, the two-dimensional value being represented by a polygon, the two-dimensional value comprising a representation of vertices of the polygon;
identifying each of the plurality of multi-dimensional symbols;
decoding each identified multi-dimensional symbol to provide encoded geometry information;
accessing an encoded geometry repository using the encoded geometry information, the encoded geometry repository comprising an entry associating the encoded geometry with a unique identifier of an information handling system; and,
retrieving the unique identifier of the information handling system associated with the encoded geometry information.

2. The method of claim 1, wherein:
the encoded geometry uniquely identifies a part.

3. The method of claim 1, wherein:
the scanning comprises performing a depth scanning operation; and,
point cloud data representing each of the plurality of multi-dimensional system is generated by the depth scanning operation.

4. The method of claim 1, wherein:
the plurality of multi-dimensional symbols provide a unique encoded geometry.

5. The method of claim 4, wherein:
each multi-dimensional symbol is a three-dimensional symbol and the encoded geometry is a three-dimensional part comprising a plurality of the three-dimensional symbols.

6. The method of claim 1, further comprising:
obtaining information regarding the information handling system associated with the encoded geometry; and,
presenting the information regarding the information handling system associated with the encoded geometry to a user via an encoded geometry screen presentation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
scanning an encoded geometry, the scanning comprising scanning a plurality of multi-dimensional symbols of the encoded geometry, each of the plurality of multi-dimensional symbols representing a plurality of constrained values, each of the plurality of constrained values including a two-dimensional value, the two-dimensional value being represented by a polygon, the two-dimensional value comprising a representation of vertices of the polygon;
identifying each of the plurality of multi-dimensional symbols;
decoding each identifier multi-dimensional symbol to provide encoded geometry information;
accessing an encoded geometry repository using the encoded geometry information, the encoded geometry repository comprising an entry associating the encoded geometry with a unique identifier of an information handling system; and,
retrieving the unique identifier of the information handling system associated with the encoded geometry information.

8. The system of claim 7, wherein:
the encoded geometry uniquely identifies a part.

9. The system of claim 7, wherein:
the scanning comprises performing a depth scanning operation; and,
point cloud data representing each of the plurality of multi-dimensional system is generated by the depth scanning operation.

10. The system of claim 7, wherein:
the plurality of multi-dimensional symbols provide a unique encoded geometry.

11. The system of claim 10, wherein:
each multi-dimensional symbol is a three-dimensional symbol and the encoded geometry is a three-dimensional part comprising a plurality of the three-dimensional symbols.

12. The system of claim 7, the instructions executable by the processor are further configured for:
obtaining information regarding the information handling system associated with the encoded geometry; and,
presenting the information regarding the information handling system associated with the encoded geometry to a user via an encoded geometry screen presentation.

13. A non-transitory, computer-readable storage medium embodying computer program code, the computer program code comprising computer executable instructions configured for:
scanning an encoded geometry, the scanning comprising scanning a plurality of multi-dimensional symbols of the encoded geometry, each of the plurality of multi-dimensional symbols representing a plurality of constrained values, each of the plurality of constrained values including a two-dimensional value, the two-dimensional value being represented by a polygon, the two-dimensional value comprising a representation of vertices of the polygon;
identifying each of the plurality of multi-dimensional symbols;
decoding each identifier multi-dimensional symbol to provide encoded geometry information;
accessing an encoded geometry repository using the encoded geometry information, the encoded geometry repository comprising an entry associating the encoded geometry with a unique identifier of an information handling system; and,
retrieving the unique identifier of the information handling system associated with the encoded geometry information.

14. The non-transitory, computer-readable storage medium of claim 13, wherein:
the encoded geometry uniquely identifies a part.

15. The non-transitory, computer-readable storage medium of claim 13, wherein:

the scanning comprises performing a depth scanning operation; and, point cloud data representing each of the plurality of multi-dimensional system is generated by the depth scanning operation.

16. The non-transitory, computer-readable storage medium of claim 13, wherein:

the plurality of multi-dimensional symbols provide a unique encoded geometry.

17. The non-transitory, computer-readable storage medium of claim 16, wherein:

each multi-dimensional symbol is a three-dimensional symbol and the encoded geometry is a three-dimensional part comprising a plurality of the three-dimensional symbols.

18. The non-transitory, computer-readable storage medium of claim 13, wherein the computer executable instructions are further configured for:

obtaining information regarding the information handling system associated with the encoded geometry; and, presenting the information regarding the information handling system associated with the encoded geometry to a user via an encoded geometry screen presentation.

19. The non-transitory, computer-readable storage medium of claim 13, wherein: the computer executable instructions are deployable to a client system from a server system at a remote location.

20. The non-transitory, computer-readable storage medium of claim 13, wherein: the computer executable instructions are provided by a service provider to a user on an on-demand basis.

* * * * *